T. SYMONDS.
Dredging-Buckets.

No. 153,395. Patented July 21, 1874.

Attest.
George C. Fobes.
A. S. Taylor.

Inventor.
Thomas Symonds

UNITED STATES PATENT OFFICE.

THOMAS SYMONDS, OF CAMDEN, NEW JERSEY.

IMPROVEMENT IN DREDGING-BUCKETS.

Specification forming part of Letters Patent No. 153,395, dated July 21, 1874; application filed June 16, 1874.

*To all whom it may concern:*

Be it known that I, THOMAS SYMONDS, of Camden, in the county of Camden and State of New Jersey, have invented certain new and useful Improvements in Dredging-Bucket and Grapple; and I do hereby declare that the following is a full, clear, and exact description thereof, which will enable others skilled in the art to which it pertains to make and use the same, reference being had to the accompanying drawings, and to the letters of reference marked thereon, which form a part of this specification.

My invention relates to a combined dredging-bucket and grapple; and it consists in providing a dredging-bucket with two detachable plates on each side, which may be easily removed when it is desired to use it as a grapple for grappling logs, large stones, &c., and which can be readily replaced in their former position when it is desired to dredge for gravel, sand, oysters, and other similar objects. The beds of rivers, bays, &c., as is well known, vary very much in quality and general contour. It also consists in constructing the teeth of grapples or dredging-buckets of T-iron or other webbed or ribbed iron, such as channel-bar iron, &c., which are tapered to a cutting or digging point or edge, and can be riveted or otherwise secured to the bucket or grapple. The object is to provide light, and yet very strong and stiff teeth, that are not easily bent or broken, and form less impediment in dredging than if they were of very thick iron.

Figure 1:
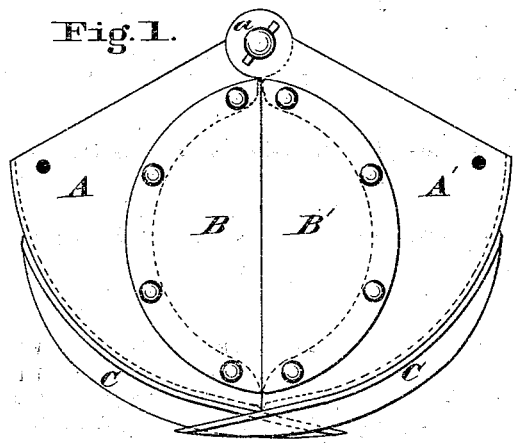
Figure 2:
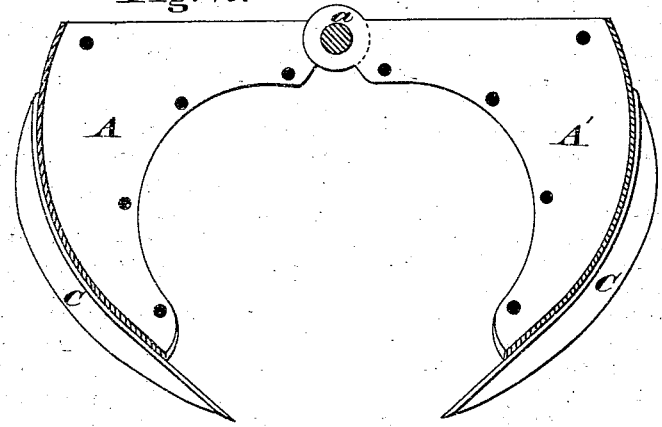
Figure 4:
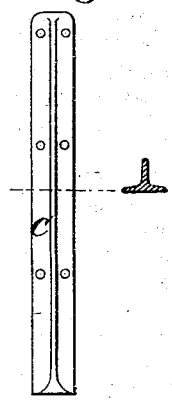
Figure 3:
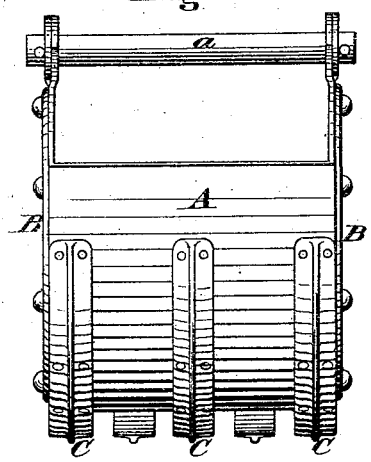

In the accompanying drawing, Figure 1 is a side view of a dredging-bucket with the plates in position. Fig. 2 is a side view of the same with the plates removed, forming a grapple. Fig. 3 is an end or edge view of the bucket. Fig. 4 represents a front view and section of one of the teeth detached.

In the drawing, A A' represent the two jaws of a dredging-bucket hinged together on the shaft $a$. To the jaws are secured, by screws, bolts, or other means, the two plates B B', which make the bucket a closed one, and when these are removed it is an open-ended bucket or grapple, as shown in Fig. 2. The framework of this may be all open-work, and consist of bars riveted or bolted together, if desired, and to these my plates may be secured to close the ends. To the back of the jaws I rivet, or secure in any other suitable manner, the teeth C C, which I preferably make of T-iron with the points or cutting-edges tapered down, so as to form no obstruction in dredging, but that they may easily work their way into the objects to be dredged for. These teeth may be made of channel-bar or any webbed or ribbed iron, if desired, which will give the same stiffness and rigidity as the T-iron.

The advantages of making my dredging-bucket with the plates removable will be readily understood, as it saves the frame-work for a separate grapple, as in the one is combined a close and open dredging-bucket, and as the open bucket it can be readily used for a grapple for logs, large stone, &c.

Having thus described my invention, what I claim, and desire to secure by Letters Patent, is—

1. The combination, with a close dredging-bucket, of the detachable plates B B, constructed and arranged as shown, and for the purpose herein set forth.

2. The combination, with dredging-buckets and grapples, of the webbed teeth, constructed and arranged as herein shown and described, for the purpose specified.

In testimony that I claim the foregoing as my own I hereby affix my signature in presence of two witnesses.

THOMAS SYMONDS.

Witnesses:
GEORGE C. FOBES,
A. S. TAYLOR.